United States Patent [19]
Xiong

[11] Patent Number: 5,960,108
[45] Date of Patent: Sep. 28, 1999

[54] METHOD AND SYSTEM FOR CREATING AN IMAGE-BASED VIRTUAL REALITY ENVIRONMENT UTILIZING A FISHEYE LENS

[75] Inventor: Yalin Xiong, Santa Clara, Calif.

[73] Assignee: Apple Computer, Inc., Cupertino, Calif.

[21] Appl. No.: 08/873,438

[22] Filed: Jun. 12, 1997

[51] Int. Cl.[6] .................................................. G06K 9/36
[52] U.S. Cl. ........................................ 382/154; 382/284
[58] Field of Search ................................. 382/154, 284, 382/296; 348/42–48, 584; 345/419; 356/3–12

[56] References Cited

U.S. PATENT DOCUMENTS

| | | | |
|---|---|---|---|
| 4,406,532 | 9/1983 | Howlett | 354/114 |
| 5,103,306 | 4/1992 | Weiman et al. | 358/103 |
| 5,513,276 | 4/1996 | Theodoracatos | 382/154 |

*Primary Examiner*—Christopher S. Kelley
*Attorney, Agent, or Firm*—Sawyer & Associates

[57] ABSTRACT

The present invention provides a method and system for providing a virtual reality environment utilizing images from a lens on a display of a data processing system is disclosed. The method and system comprises providing a plurality of images, each of the plurality of images including a plurality of parameters and optimizing the plurality of parameters for each of the plurality of images in accordance with a radial distortion model. The method and system also including generating the virtual reality environment of the plurality of images based upon the optimization of the plurality of parameters.

15 Claims, 6 Drawing Sheets

1 ITERATION  10

10 ITERATIONS  10

IDEAL EQUI-DISTANCE MODEL  10

CUBIC DISTORTION MODEL  10

METHOD AND SYSTEM FOR CREATING AN IMAGE-BASED VIRTUAL REALITY ENVIRONMENT UTILIZING A FISHEYE LENS

FIELD OF THE INVENTION

The present invention relates generally to creating a virtual reality environment, and more particularly the present invention relates to creating a virtual reality environment utilizing a fisheye lens.

BACKGROUND OF THE INVENTION

Image-based virtual reality is emerging as a major alternative to the more traditional 3D-based virtual reality (VR) environment. Unlike the virtual environment generated by 3D graphics, in which the information to represent the environment is kept internally as geometry and texture maps, an image-based VR environment represents the environment by one or more images, which can be either captured by camera or synthesized from 3D computer graphics.

There are two phases in creating VR environments, the authoring phase and the run time phase. The authoring phase is the process of providing an accurate representation of the VR environment. The runtime phase is directed to providing that representation on the computer display. The present invention is directed toward the authoring phase of creating a VR environment.

There are two types of image-based VR representations: the single-node 2D representation, which represents the world around one nodal point by a panorama, and the light-field 4D representation, which represents the world contained in a pre-defined 3D volume. The main advantages of the image-based VR are its simplicity for rendering (i.e., no complicated 3D real-time rendering), its photographic quality realism, and the 3D illusion experienced by users even though no geometric information is available.

The present invention is related to the problem in creating contents for single-node 2D panoramas. The conventional way to create a surrounding panorama is by rotating a camera around its nodal point. Utilizing a 15 mm rectilinear lens with 35 mm film, it takes as many as 12 pictures to capture a panorama with 90-degree vertical field of view. Capturing a full spherical panorama requires at even more pictures and involves rotating the camera along two different axes. In addition, the image registration process becomes complicated.

Fortunately, commercial fisheye lenses exist, which produce very high quality pictures with a near 180-degree field of view, i.e., a hemisphere or an even larger field of view. Accordingly, utilizing a fisheye lens 2 to 4 pictures can be taken to provide a full 360 degree field of view. It is desirable to use such a fisheye lens to capture the spherical panorama to minimize the number of pictures that have to be taken.

The problem with utilizing a fisheye lens is that they are not easily "stitched" together utilizing conventional techniques. That is, accurately registering the fisheye images is complicated utilizing traditional techniques. In addition, heretofore elaborate calibration equipment for the fisheye lens is required to calibrate traditional fisheye lens. Elaborate calibration techniques prohibitively increase the overall costs and are available to only the most sophisticated VR environments.

Accordingly, what is needed is a method and system for creating a VR environment which overcomes the problems associated creating a 3D VR environment. The present invention addresses such a need.

SUMMARY OF THE INVENTION

The present invention provides a method and system for providing a virtual reality environment on a display of a data processing system. The method and system comprises providing a plurality of images, each of the plurality of images including a plurality of parameters and optimizing the plurality of parameters for each of the plurality of images in accordance with a radial distortion model. The method and system also includes generating the virtual reality environment of the plurality of images based upon the optimization of the plurality of parameters.

Accordingly, through the optimization of the images and the self-calibration in accordance with equi-distance model in conjunction with a radial distortion model a fisheye lens can be advantageously utilized to provide a VR environment. The system has wide application and due to its simplicity is adaptable to a variety of environments, whether amateur or professional in nature.

DESCRIPTION OF THE INVENTION

Figure 1:
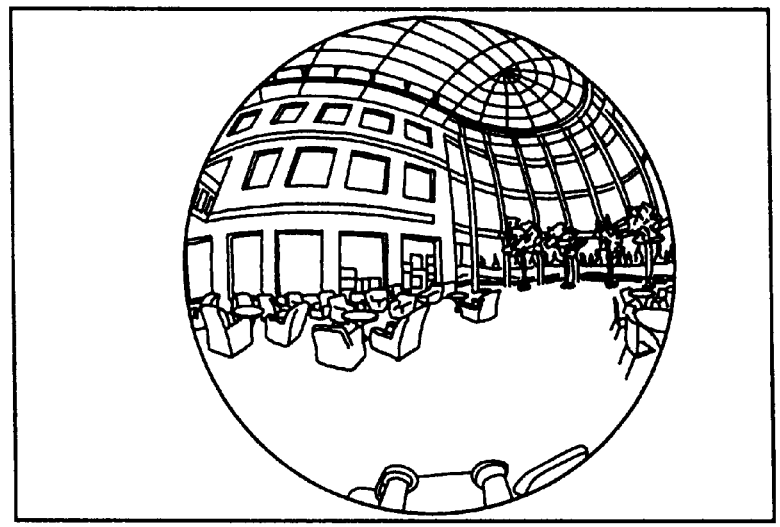
FIG. 1 illustrates an image taken utilizing a fisheye lens.

The present invention relates to creating a virtual reality environment in a data processing system utilizing a fisheye lens. The following description is presented to enable one of ordinary skill in the art to make and use the invention and is provided in the context of a patent application and its requirements. Various modifications to the preferred embodiment will be readily apparent to those skilled in the art and the generic principles herein may be applied to other embodiments. Thus, the present invention is not intended to be limited to the embodiment shown but is to be accorded the widest scope consistent with the principles and features described herein.

The present invention provides for a method and system for registering or stitching images provided by a fisheye lens together to create 3D virtual reality environments that is simpler and faster than conventional registering techniques whether utilizing rectilinear or a fisheye lens. The system and method in accordance with the present invention utilizes a radial distortion model in conjunction with the conventional use of the equidistance model to model the images from the fisheye lens such that the images can be registered seamlessly. In addition in a system and method in accordance with the present invention, the lens is self calibrated. Since the image center can be easily determined due to the projection model utilized the calibration can be accomplished during the time that the images are being registered. To describe the present invention in more detail refer to the following discussion in conjunction with the accompanying figures.

It is known that the fundamental difference between a fisheye lens and an ordinary rectilinear lens is that the projection from a 3D ray to a 2D image position in the fisheye lens is intrinsically non-perspective. There are many proposed projection models for fisheye lenses. It has been determined by the applicants that an equi-distance projection model, is a reasonable first-order approximation. However in addition to the equi-distance model, a radial projection model is utilized as the distortion model typically through the use of a third order polynomial to accurately model the fisheye lens. Through the use of the radial projection model, applicants have determined that such distortion-corrected fisheye images can be registered seamlessly.

Conventional registration techniques that utilize fisheye lens assume either an ideal projection model or use the distortion model of rectilinear lenses by adding more non-linear terms. Conventional registration techniques are not accurate enough for the purpose of registering multiple fisheye images into panoramas. Furthermore, it is also important to minimize the requirements for elaborate calibration equipment since the market of this technique is ordinary customers with no access to sophisticated laboratories. Therefore, self calibration of the fisheye lens is also desirable.

The idea of self-calibrating lenses is very appealing to anyone who has to calibrate lenses on regular basis. By establishing the correspondence between two or more images, it has been shown that many camera parameters can be recovered without a priori knowledge of the camera motion or scene geometry. Unfortunately, heretofore self calibration in general is unstable as the image center and the field of view are unknown. The system and method in accordance with the present invention overcomes this instability.

To further clarify this point refer now to FIG. 1. FIG. 1 illustrates an image 10 taken by a fisheye lens. The image center for a fisheye lens which utilizes the radial distortion projection model in accordance with the present invention can be determined trivially as the center of the ellipse which envelopes the image. When the camera is rotated around its nodal point to capture the spherical panorama, the wrap-around effect, i.e., the overlap between the first and last images, provides enough constraints for its field of view. Once these intrinsic parameters are known, the self calibration becomes very stable.

Another feature in accordance with the present invention is that the images are registered while self-calibrating the camera. The benefit is that the quality of the calibration is iteratively improved because of the improved image registration, and the quality of the image registration is iteratively improved because of the improved calibration.

In a preferred embodiment, a multi-level gradient based registration to register the fisheye images while self-calibrating its distortion parameters and field of view is utilized. The Levenberg-Marquardt minimization can be utilized to provide the registration process with the radial distortion modelled as a cubic polynomial results in excellent spherical panoramas. A system and method in accordance with the present invention can be utilized for a variety of tasks such as navigation, teleoperation, etc., where large field of view is desired. Typically, the method and system can be implemented in a computer system via the hard drive or could implemented via any computer readable medium, such as floppy disks or the like. To describe the features of the present invention in accordance with general and specific embodiment, refer to the following discussion.

Figure 1A:
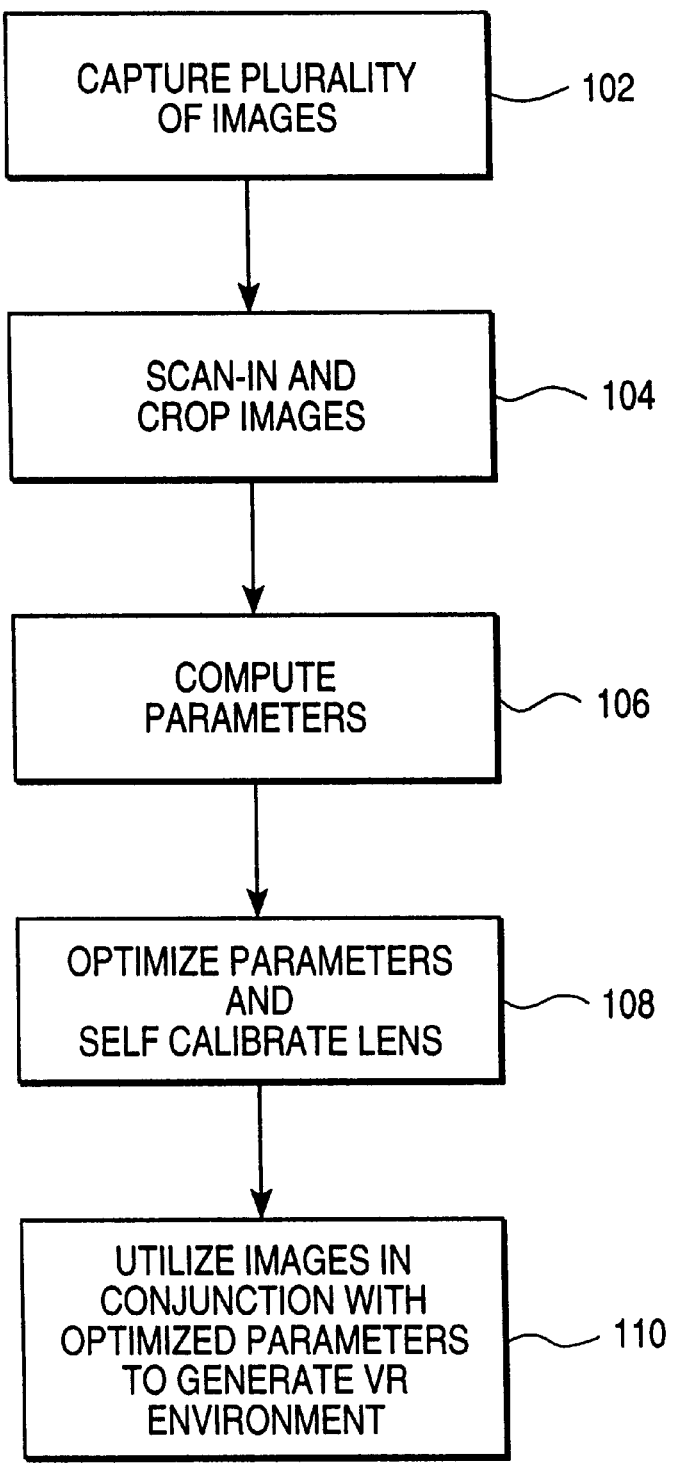
FIG. 1a is a flow chart which illustrates a general embodiment of the optimization and self calibration of a lens in accordance with the present invention.

FIG. 1*a* is a flow chart which illustrates a general embodiment of the operation of a system in accordance with the present invention. Firstly a plurality of images (typically two to four) are captured, via step 102. Next, the images are scanned in to a computer (not shown) by conventional means, and the images are preferably cropped to properly center the images, via step 104. Next a plurality of parameters are computed for each of the images, via step 106. Typical parameters to be computed are, for example, the grey scale, gradient, focal length of the plurality of images. Next the parameters are optimized and the lens is self calibrated to provide exact values for each of the parameters, via step 108. As has been before mentioned, optimization of the parameters is accomplished through the use of a radial distortion model in conjunction with the equi-distance projection model. Next, the images are utilized in conjunction with the optimized parameters to generate a virtual reality environment, via step 110.

To more describe the present invention in the context of a more specific example, refer now to the following discussion in conjunction with the associated figures.

Fisheye Projection Model and Distortion

Figure 2:
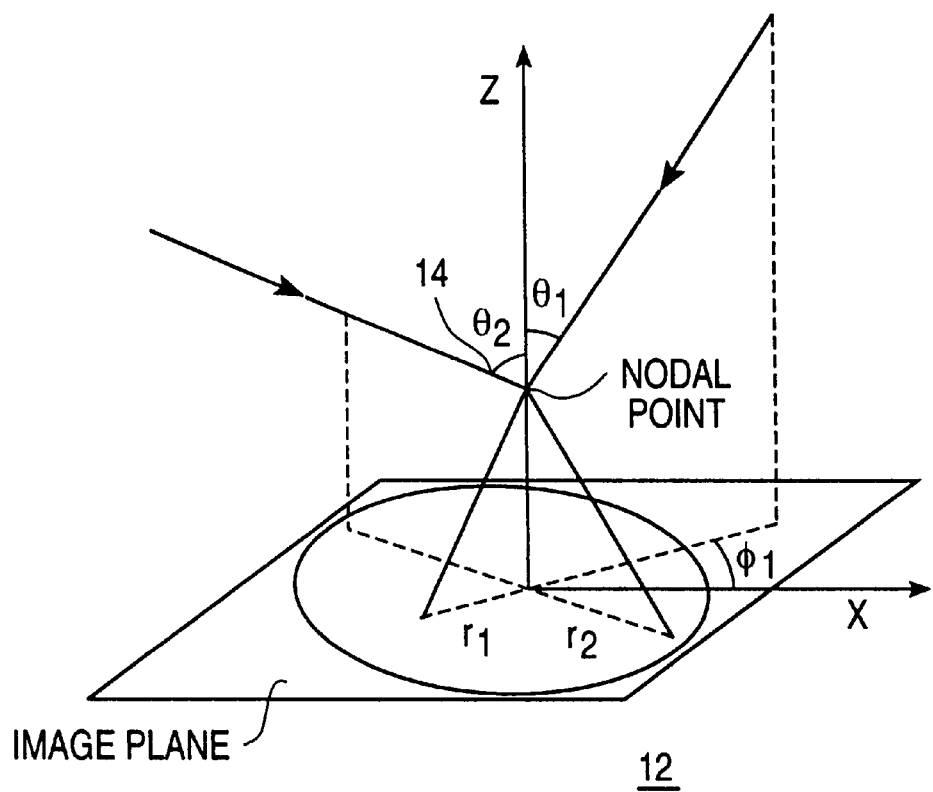
FIG. 2 illustrates an equi-distance projection model for a fisheye lens.

FIG. 2 illustrates an equi-distance projection model 12 for a fisheye lens. The projection from 3D rays to 2D image positions in a fisheye lens can be approximated by the so-called "equi-distance" model shown in FIG. 2. Suppose a 3D ray from the nodal point 14 of the lens is specified by two angles $\theta$ and $\phi$ as shown in FIG. 1. Then the equi-distance projection model projects the 3D ray into an image position (x,y), in which $$x = c\theta\cos(\phi), \quad \text{(Equation 1)}$$

$$y = c\theta\sin(\phi), \quad \text{(Equation 2)}$$

where c is a scale factor determined by the focal length and the scale of the film scanning. In other words, the equi-distance model maps the latitude angle $\theta$ to the polar distance r in the image, i.e., $$r = \sqrt{x^2 + y^2} = c\theta \quad \text{(Equation 3)}$$

The advantage of the equi-distance projection model over the traditional planar projection model is that it allows an arbitrarily large field of view, at least mathematically. Current commercial fisheye lenses include Nikon 8 mm (180-degree FOV) and 6 mm (220-degree FOV) in which the equi-distant model is a good first order approximation.

The radial distortion model can then be utilized to model the higher order effects in the mapping between the latitude angle $\theta$ and the polar distance r:

$$r = c_1\theta + c_2\theta^2 + c_3\theta^3 + \quad \text{(Equation 4)}$$

where the order of the polynomial can be determined experimentally.

Image Registration and Self Calibration

Camera Setup

Figure 3:
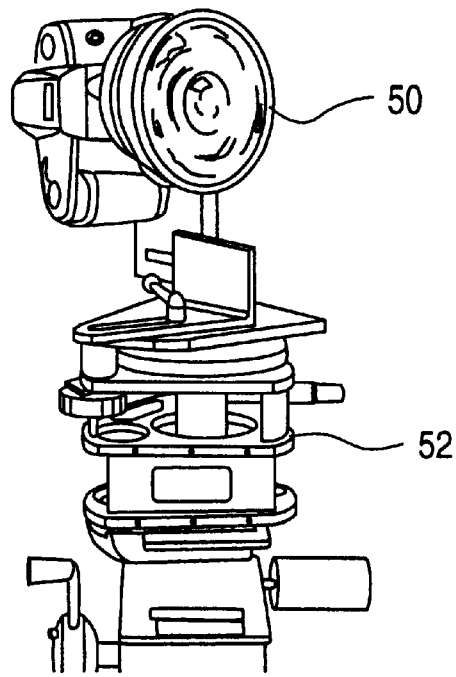
FIG. 3 shows the setup for capturing the spherical panorama and self-calibrating.

FIG. 3 shows the setup for capturing the spherical panorama and for self-calibrating a fisheye lens. The camera 50, for example a Nikon N900 camera, is mounted on a platform 52, which can slide in two orthogonal directions. The pointing direction of the camera is slightly tilted upward for reasons which will be explained later.

The nodal point of the fisheye lens within the camera 50 needs to be adjusted so that it lies on the rotation axis of the tripod. There are many practical ways to achieve it. A simple way is to locate an occluding edge of a far away object by a near object, and track it when panning the camera. If the edge stays static on the far away object, then the nodal point is already on the rotation axis. Otherwise, adjust the platform 50 until the occluding edge stays static.

Once the camera 50 is set up properly, in a first embodiment either four pictures can be taken by rotating the camera 90 degrees after every shot, or in a second embodiment three pictures can be taken by rotating it 120 degrees. The four-picture method is typically preferred simply because it provides larger overlap regions.

Objective Function and Minimization

Given four images $I_0$, $I_1$, $I_2$, and $I_3$, the registration and self-calibration problems are formulated as a single nonlinear minimization problem. The 3D reference frame is a camera coordinate of image $I_0$. The following parameters are adjusted in the minimization process:

1. Camera Rotations: The rotations of the camera coordinate of $I_1$, $I_2$, and $I_3$ with respect to the reference frame $I_0$ are parameterized by different axes and rotation angles because it is desired to extend the algorithm to accommodate arbitrary rotations. The rotations are parameterized by roll/pitch/yaw angles $q_i$ (i=1,2,3). The total number of rotation parameters is nine.

2. Image Centers and Radii: As shown in FIG. 1, the envelope of the image is an ellipse with two slightly different radii. The parameters are image center positions $o_i$ and radii $R_i$ (i=0,1,2,3). The total number of parameters is sixteen.

3. Radial Lens Distortion: A cubic polynomial is used to represent the mapping between the latitude angle and the polar distance for all images. The parameters are $c_1$, $c_2$, and $c_3$. The reason to choose a cubic polynomial is purely experimental, and specific to the Nikon 8 mm fisheye lens which is used in this embodiment. For other fisheye lenses, the order of the polynomial may need to be higher or lower.

4. Image Brightness Difference: The brightness scaling factor s (contrast) and offset a (brightness). The parameters are $s_i$ and $a_i$, (i=1,2,3).

First consider the registration of two fisheye images $I_i$ and $I_j$. The objective function is:

$$S_{ij} = \frac{1}{A_{ij}} \sum_{x_k \in A_{ij}} e_k^2 \qquad \text{(Equation 5)}$$

$$e_k = s_i I_i(x_k) + a_i - s_j I_j(T(x_k; p)) - a_j.$$

Where $A_{ij}$ is the overlap region, $T(\cdot)$ is a transformation function which transform the image position $x_k$ in $I_i$ to its corresponding position in $I_j$, and p is the vector of all parameters listed above except the brightness compensation parameters. The overlap region $A_{ij}$ is determined by the current estimate of the camera parameters and rotations.

The transformation function can be decomposed into three concatenated functions:

$$T(x_k) = T_3(T_2(T_1(x_k))). \qquad \text{(Equation 6)}$$

The first function $T_1(x_k)$ transforms the image position $x_k$ into a 3D ray direction $(\theta, \phi)$. In the following discussion, the subscript k is dropped to simplify notation. Let $$x = [xy]^T, \qquad \text{(Equation 7)}$$

$$o_i = [o_x^i o_y^i]^T \qquad \text{(Equation 8)}$$

$$R_i = [R_x^i R_y^i]^T \qquad \text{(Equation 9)}$$

the image position x can be represented in the polar coordinate of image $I_i$ as $$r_i = \sqrt{\left(\frac{x - o_x^i}{R_x^i}\right) + \left(\frac{y - o_y^i}{R_y^i}\right)} \qquad \text{(Equation 10)}$$

$$\phi_i = \operatorname{atan2}\left(\frac{y - o_y^i}{R_y^i}, \frac{x - o_x^i}{R_x^i}\right) \qquad \text{(Equation 11)}$$

Therefore, the 3D ray direction (note: Note that the same notation is used for the 2D polar direction and the 3D longitude angle because they are the same as long as the tangential distortion is zero, which is assumed in this paper) of x represented in the camera coordinate of $I_i$ is:

$$\theta_i = \Theta(r_i; c_1, c_2, c_3), \qquad \text{(Equation 12)}$$

$$\phi_i = \phi_i, \qquad \text{(Equation 13)}$$

where $\Theta(\cdot)$ is the inverse function of the distortion polynomial in Equation 4. In practice, the inverse can be solved using the Newton-Raphson root-finding method.

The second function $T_2(\cdot)$ converts the 3D ray direction into the camera coordinate of $I_j$. Let $M_i$ and $M_j$ be 3×3 rotation matrices computed from the roll/pitch/yaw angles $q_i$ and $q_j$, then:

$$\begin{bmatrix} u_x^j \\ u_y^j \\ u_z^j \end{bmatrix} = M_j M^{-1}_i \begin{bmatrix} u_x^i \\ u_y^i \\ u_z^i \end{bmatrix} \qquad \text{(Equation 14)}$$

in which $$\begin{bmatrix} u_x^j \\ u_y^j \\ u_z^j \end{bmatrix} = \begin{bmatrix} \sin\theta_j \cos\phi_j \\ \sin\theta_j \sin\phi_j \\ \cos\theta_j \end{bmatrix} \qquad \text{(Equation 15)}$$

$$\begin{bmatrix} u_x^i \\ u_y^i \\ u_z^i \end{bmatrix} = \begin{bmatrix} \sin\theta_i \cos\phi_i \\ \sin\theta_i \sin\phi_i \\ \cos\theta_i \end{bmatrix} \qquad \text{(Equation 16)}$$

Therefore, the 3D ray direction in the camera coordinate of $I_j$ can be represented as $$\theta_j = a \cos(u_z^j) \qquad \text{(Equation 17)}$$

$$\theta_j = a \tan 2(u_y^j, u_x^j) \qquad \text{(Equation 18)}$$

The third function $T_3(\cdot)$ maps the 3D ray $(\theta_j, \phi_j)$ onto the image position in $I_j(x',y')$. The image position in polar coordinate is $$r_j = c_1 \theta_j + c_2 \theta_j^2 + c_3 \theta_j^3 \qquad \text{(Equation 19)}$$

$$\phi_j = \phi_j \qquad \text{(Equation 20)}$$

And in Cartesian image coordinate, the position is $$x' = o_x^j + R_x^j r_j \cos \theta_j \quad \text{(Equation 21)}$$

$$y' = o_y^j + R_y^j r_j \sin \theta_j \quad \text{(Equation 22)}$$

The minimization of the objective function $S_{ij}$ in Equation 5 is reached when its derivative is zero, i.e., $$\frac{\partial S_{ij}}{\partial p} = \frac{1}{A_{ij}} \sum_{x_k \in A_{ij}} e_k S_j \left( \frac{\partial I_j}{\partial x'} \frac{\partial x'}{\partial p} + \frac{\partial I_j}{\partial y'} \frac{\partial y'}{\partial p} \right) = 0$$

$$\frac{\partial S_{ij}}{\partial s_i, s_j, a_i, a_j} = 0$$

When four images are considered together, the overall objective function is the sum of the all image pairs with overlap:

$$S = \sum_{\forall ij,\, A_{ij} = \phi} S_{ij} \quad \text{(Equation 23)}$$

The Levenberg-Marquardt method is then used to minimize the objective function with proper initial estimates of parameters.

Initial Estimates and Damping

The initial estimate problem is important for any nonlinear optimization in order to avoid local minima and divergences. Among the parameters that need to be optimized, the initial radial distortion model can be set to the ideal equi-distance projection ($c_1 = 2/\pi$, $c_2 = c_3 = 0.0$) and brightness difference parameters to either s=1.0 and a=0.0 or values computed from camera exposure/aperture settings. The initial estimates the rotation angles, image centers and radii are especially important because they are the main sources of the nonlinearity in the objective function.

Between two arbitrary fisheye images taken by rotating the camera around its nodal point, an initial estimate of the rotation represented by either the roll/pitch/yaw angles q or a rotation matrix M is needed. If there are, for example, three points in two images matched manually, the following function can be minimized to get an initial estimate of the rotation matrix:

$$E = \sum_{i=0}^{2} (u'_{isup} - M_i)^2 + \lambda_0 C(M) \quad \text{(Equation 24)}$$

where $u'_i$ and $u_i$ are the two 3D rays computed as in Equation 15 and Equation 16 from the image positions using the current camera parameters, and the term C(M) constrains the matrix M to be a rotation matrix, e.g., $$C(M) = \sum_{k=0}^{2} (M_k \cdot M_k - 1.0)^2 + \quad \text{(Equation 25)}$$
$$(M_0 \cdot M_1)^2 + (M_0 \cdot M_2)^2 + (M_1 \cdot M_2)^2$$

where $M_0$, $M_1$ and $M_2$ are the three column vectors of the matrix.

Figure 4:
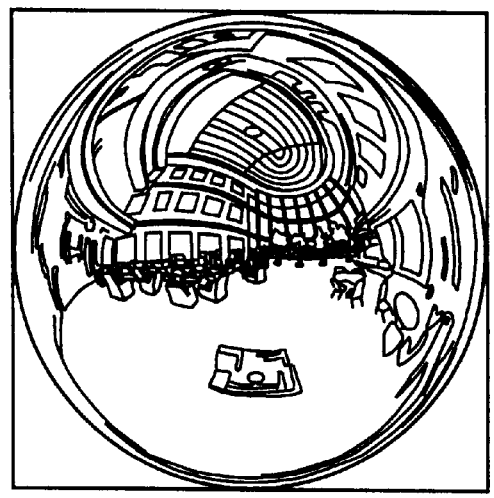
FIG. 4 shows a result of fitting an ellipse to an image.

The easiest way to locate the ellipse is to have the user specify four points in the image, and then fit an ellipse to the four points. FIG. 4 shows a result 100 of fitting an ellipse to the four points of the image. Even though the result from fitting an ellipse to the image is a good initial estimate, they usually contain an error of up to two pixels because there are blurrings and corruption in colors around the edge of the ellipse in fisheye images.

It is well known that the self calibration is difficult when the image center position is unknown. Fortunately there is an independent way to compute a good initial estimate of the image center due to the unique projection model in the fisheye lens. According to the equi-distance and the radial distortion model, the image center position coincides with the center position of the ellipse. In order for the nonlinear optimization to be stable and more likely to converge to the global minimum, experiments have shown that image center position and radii need to be dampened, i.e., the new objective function should be $$S' = S + \mu \sum_{i=0}^{3} \left( \left\| o_i - o_i^{(0)} \right\|^2 + \left\| R_i - R_i^{(0)} \right\|^2 \right) \quad \text{(Equation 26)}$$

where $o_{i(0)}$ and $R_{i(0)}$ are image center positions and radii computed from the original ellipse fittings, and $\mu$ is a constant.

Figure 5:
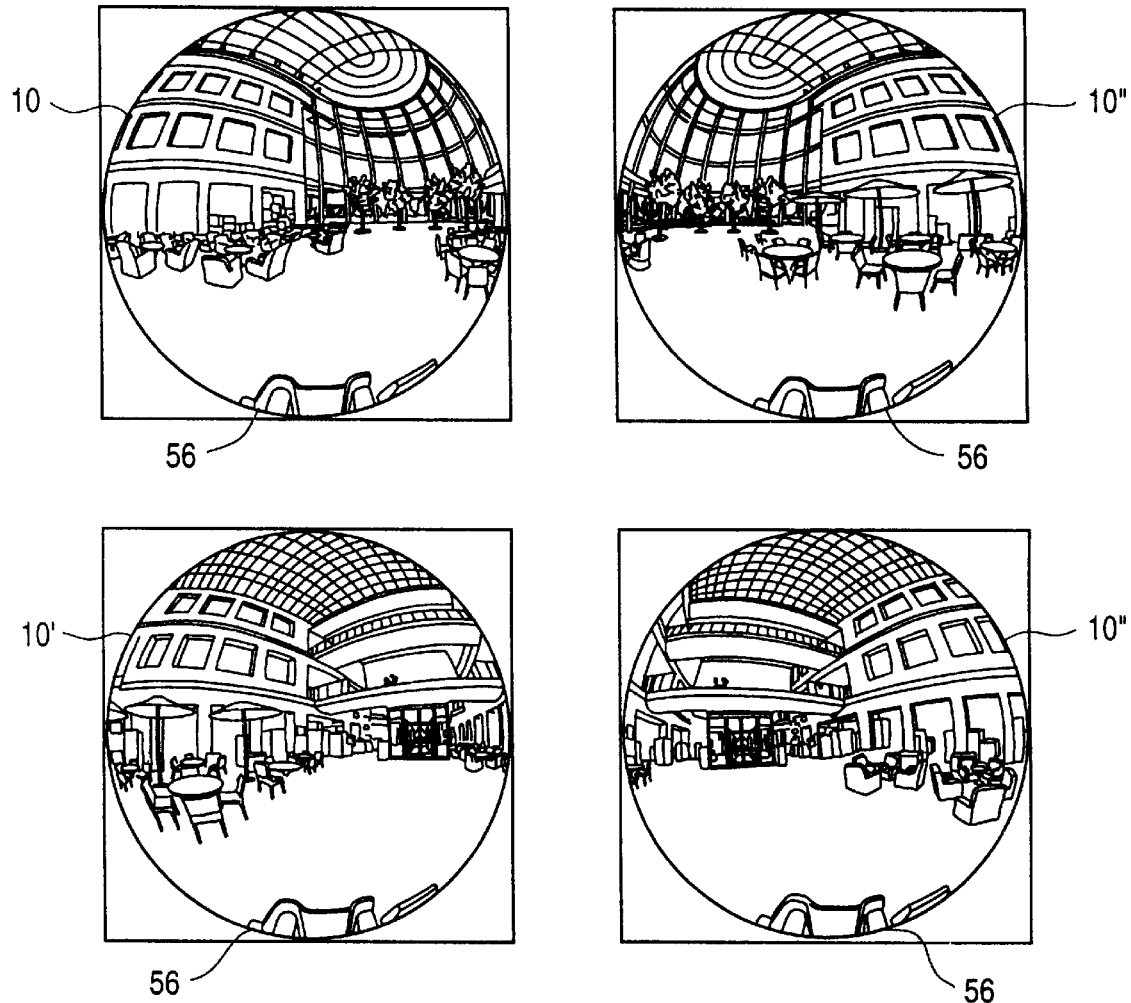
FIG. 5 illustrates four fisheye images utilized for providing a VR environment.

The above-identified algorithm has been utilized in four fisheye images, 10, 10', 10" and 10'"(FIG. 5) taken by rotating the camera roughly 90 degrees for every shot. Kodak ASA 400 film was used, and the images 10, 10', 10" and 10'" were scanned in resolution of 768×512 with 24-bit color. In the bottom portion of each image a tripod 56, which holds the camera 50 (FIG. 3), is visible. Since the field of view of the fisheye lens is near 180 degrees, and its nodal point has to be on the rotation axis, there appears to be no easy way to get around the problem. In this minimization, the bottom portion of the fisheye images is not taken into account. The reason the camera is usually tilted upward is that since the bottom portion is the tripod anyway, we are better off tilting it upward so that the top portion (near north pole) is covered redundantly.

Figure 6A:
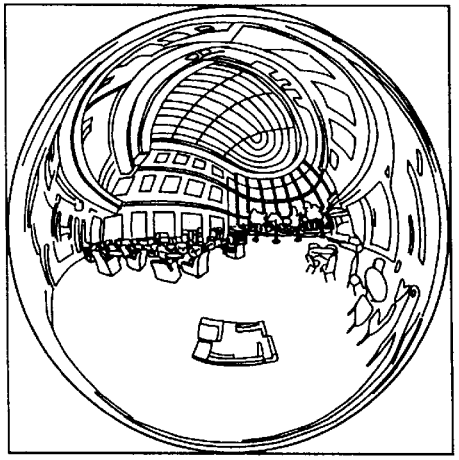
FIGS. 6a and 6b illustrate iteratively registering fisheye images.
Figure 6B:
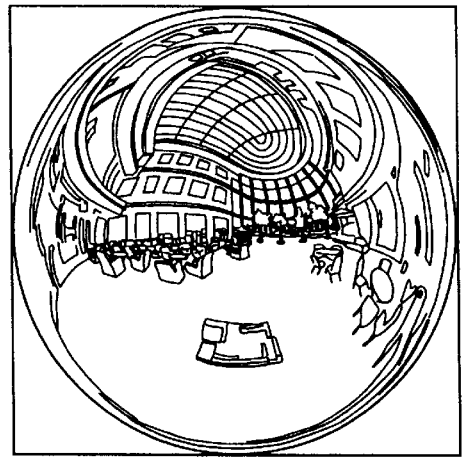

In the minimization, the image gradients are computed. In a preferred embodiment the derivative of Gaussian function as the gradient filter is utilized, the Gaussian function being utilized as the smoothing filter. The size of the smoothing and gradient filters are adjustable to achieve registration at different scales. FIGS. 6a and 6b show the feedback information after one iteration and after 10 iterations of adjustments, respectively, during the minimization. The lens distortion model is the cubic polynomial as described in Equation 4. The seams in the feedback images are intentionally left so that the users know where each fisheye image is mapped. It can be seen that the optimization converges quickly to the global minimum.

Figure 7A:
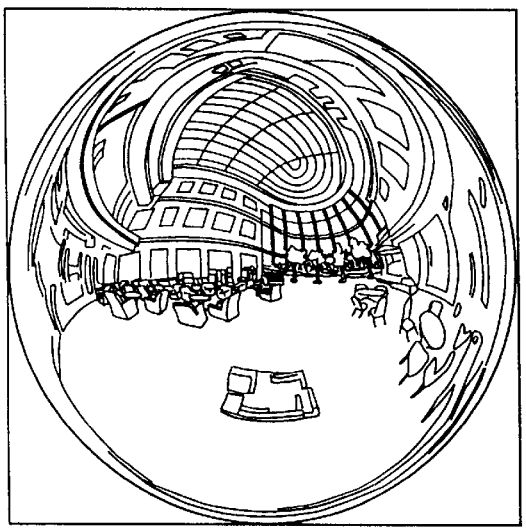
FIG. 7a illustrates final results from registration with an ideal equi-distance projection model.
Figure 7B:
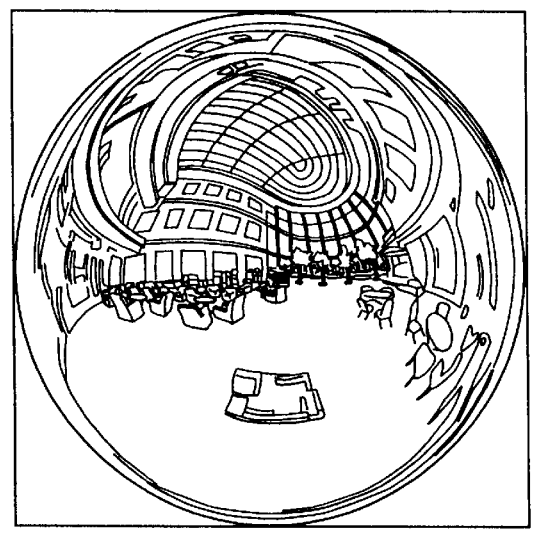
FIG. 7b illustrates final results from registration with a cubic projection model.
Figure 8:
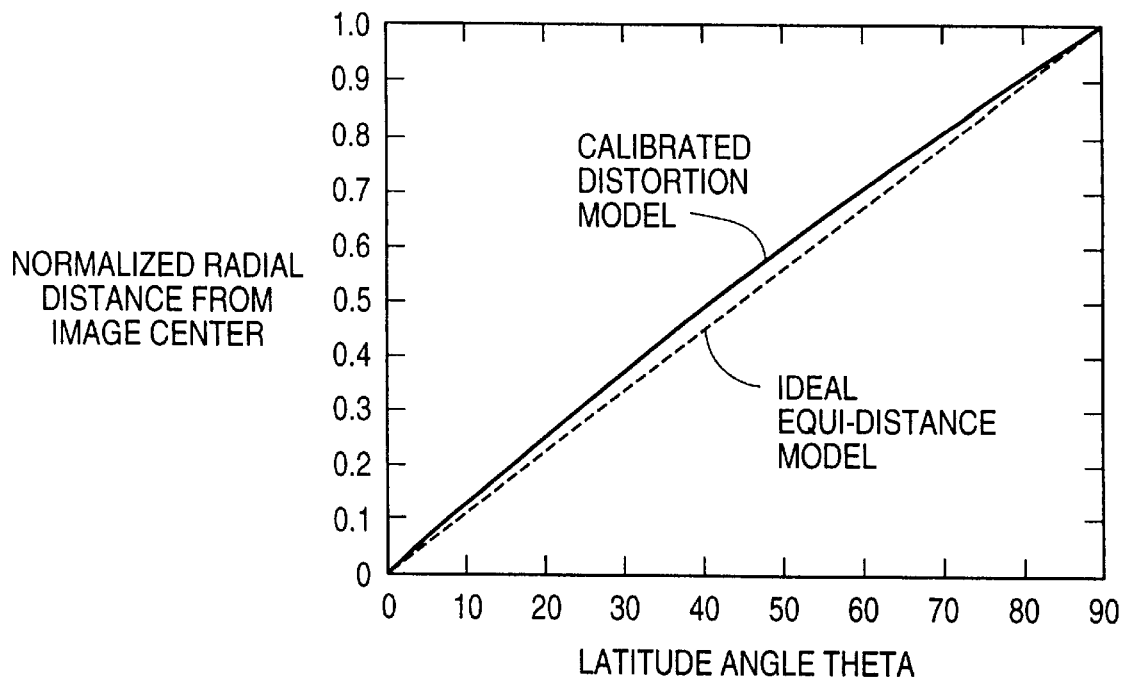
FIG. 8 shows the calibrated projection model and the ideal equi-distance projection model.

FIGS. 7a and 7b show the final results of a minimization of an image ID when the ideal equi-distance projection model and our cubic or radial distortion model respectively are used. The result of the self calibration of the fisheye lens is the cubic polynomial of the projection model specified in Equation 4. FIG. 8 is a chart that illustrates the characteristics of a calibrated projection model and the ideal equi-distance model.

Figure 9:
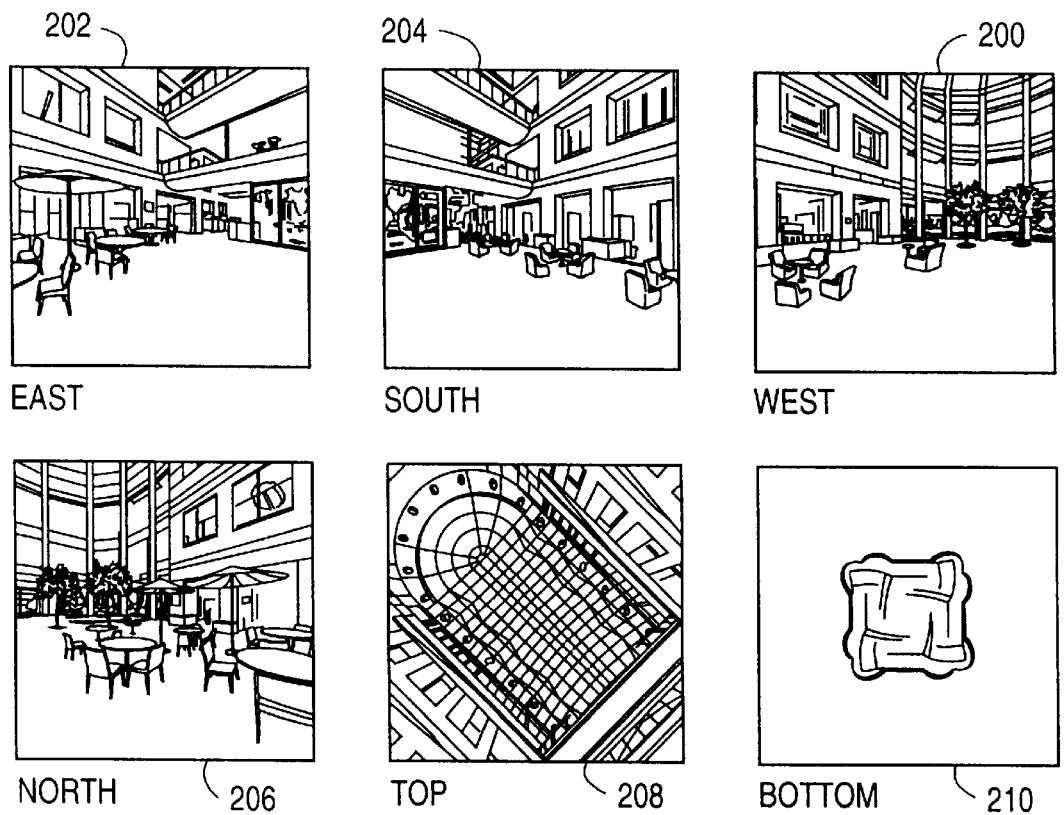
FIG. 9 shows the texture maps as projected on the six faces of the cube of a panorama.

Once the four fisheye images are registered and the fisheye lens is calibrated, we can represent the spherical panorama using any projection. The projection we used in the minimization feedback is one choice. For example, the spherical panorama can be projected onto a cube. FIG. 9 shows the texture maps 200–210 as projected on the six faces of a cube.

Accordingly, through the optimization of the images and the self-calibration in accordance with equi-distance model in conjunction with a radial distortion model a fisheye lens can be advantageously utilized to provide a VR environment. The system has wide application and due to its simplicity is adaptable to a variety of environments, whether amateur or professional in nature.

Although the present invention has been described in accordance with the embodiments shown, one of ordinary skill in the art will readily recognize that there could be variations to the embodiments and those variations would be within the spirit and scope of the present invention. Accordingly, many modifications may be made by one of ordinary skill in the art without departing from the spirit and scope of the appended claims.

What is claimed is:

1. A method for providing a virtual reality environment utilizing images from a lens to a display of a data processing system comprising the steps of:

(a) providing a plurality of images by the lens, each of the plurality of images being offset from another image of the plurality of images by a rotation and including a plurality of parameters;

(b) optimizing the plurality of parameters to register the plurality of images and self calibrate the lens for each of the plurality of images in accordance with a radial distortion model; and (c) generating the virtual reality environment of the plurality of images based upon the optimization of the plurality of parameters;

wherein the lens is a fisheye lens.

2. The method of claim 1 in which the radial distortion model comprises a cubic distortion model.

3. The method of claim 1 in which the plurality of images is between two and four images.

4. The method of claim 1 in which the parameters comprise image center and its radii, radial lens distortion, and image brightness difference.

5. The method of claim 1 in which the optimizing step comprises the steps of:

providing a proper initial estimate of the parameters;

creating an objective function based upon the initial estimates; and minimizing the objective function to optimize the parameters.

6. A system for providing a virtual reality environment utilizing images from a lens to a display of a data processing system comprising:

means for providing a plurality of images by the lens, each of the plurality of images being offset from another image of the plurality of images by a rotation and including a plurality of parameters;

means for optimizing the plurality of parameters to register the plurality of images and self calibrate the lens for each of the plurality of images in accordance with a radial distortion model; and means for generating the virtual reality environment of the plurality of images based upon the optimization of the plurality of parameters;

wherein the lens is a fisheye lens.

7. The system of claim 6 in which the radial distortion model comprises a cubic distortion model.

8. The system of claim 6 in which the plurality of images is between two and four images.

9. The system of claim 6 in which the parameters comprise image center and its radii, radial lens distortion, and image brightness difference.

10. The system of claim 6 in which the optimizing means comprises:

means for providing a proper initial estimate of the parameters;

means for creating an objective function based upon the initial estimates; and means for minimizing the objective function to optimize the parameters.

11. A computer readable medium for providing a virtual reality environment utilizing images from a lens to a display of a data processing system containing program instructions for:

(a) providing a plurality of images by the lens, each of the plurality of images being offset from another image of the plurality of images by a rotation and including a plurality of parameters;

(b) optimizing the plurality of parameters to register the plurality of images and self calibrate the lens for each of the plurality of images in accordance with a radial distortion model; and (c) generating the virtual reality environment of the plurality of images based upon the optimization of the plurality of parameters;

wherein the lens is a fisheye lens.

12. The computer readable medium of claim 11 in which the radial distortion model comprises a cubic distortion model.

13. The computer readable medium of claim 11 in which the plurality of images is between two and four images.

14. The computer readable medium of claim 11 in which the parameters comprise image center and its radii, radial lens distortion, and image brightness difference.

15. The computer readable medium of claim 11 in which the optimizing instruction comprises the instructions for:

providing a proper initial estimate of the parameters;

creating an objective function based upon the initial estimates; and minimizing the objective function to optimize the parameters.

* * * * *